//  United States

[72] Inventor Norbert Scholz
Deisenhofenerstr. 70, 8 Munich 90, Germany
[21] Appl. No. 805,762
[22] Filed Mar. 10, 1969
[45] Patented May 25, 1971
[73] Assignee Agfa-Gevaert Aktiengesellschaft
Leverkusen, Germany
[32] Priority Mar. 8, 1968
[33] Germany
[31] P 12 78 132.7-51

[54] VARIABLE FOCAL LENGTH OBJECTIVE HAVING FOUR LENS GROUPS
1 Claim, 1 Drawing Fig.
[52] U.S. Cl. ................................................. 350/184, 350/214, 350/220
[51] Int. Cl. ............................................. G02b 15/14

[50] Field of Search ........................................... 350/184, 186

[56] References Cited
UNITED STATES PATENTS
3,044,355   7/1962   Cox et al. ...................... 350/186X
3,044,356   7/1962   Cox et al. ...................... 350/186

Primary Examiner—John K. Corbin
Attorney—Michael S. Striker

ABSTRACT: A variable focal length objective of high power has four groups of lenses, and altogether 10 lenses. The variation of the focal length is effected by displacement of the second group of lenses, and the picture is maintained in a constant position by a displacement of the first group of lenses. The aperture ratio is greater than 1 : 2, the quotient of the greatest and smallest focal length is substantially 2.5, and the maximum angle of field is at least ±20°.

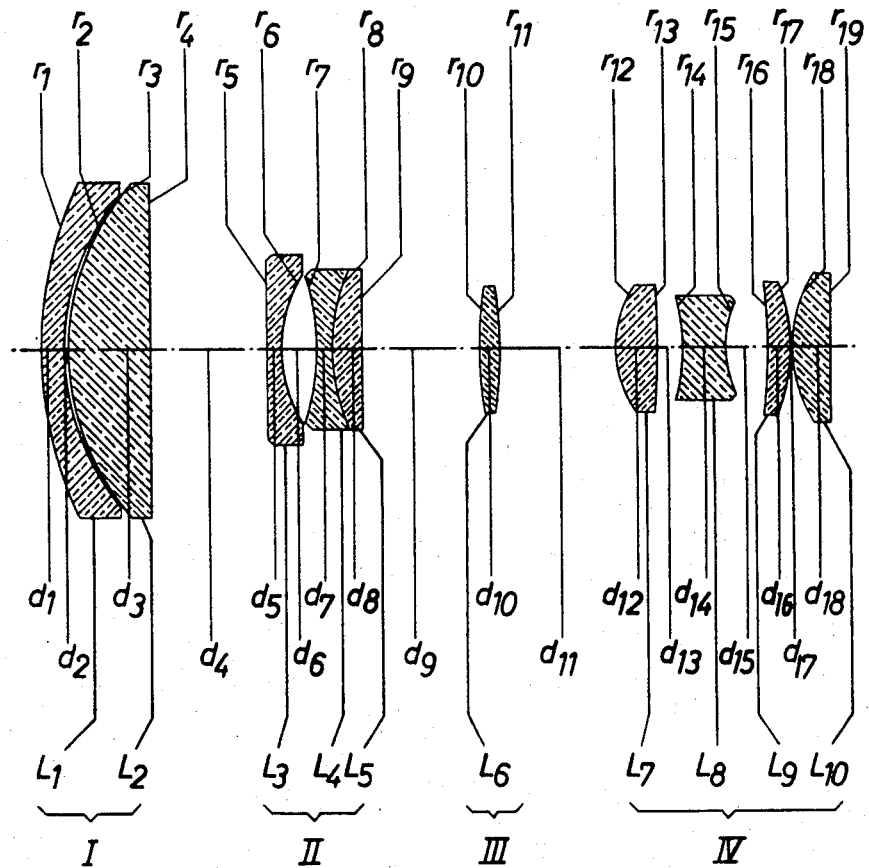

VARIABLE FOCAL LENGTH OBJECTIVE HAVING FOUR LENS GROUPS

BACKGROUND OF THE INVENTION

The present invention relates to a high power objective having a variable focal length which is particularly suited for super 8 mm. photographic film. The position of the picture is constant for the entire variation range of the focal length, and the aperture ratio is constant.

Objectives of this type are known.

The optical system of the objective according to the invention has four groups of lenses, or lens means, which comprise altogether ten lenses. The lens means in the rear facing the plane of the film, consists of four lenses in front of which a variation system consisting of three lens means is arranged. The variation system includes, in the order from the front to the rear and in direction of the path of light, a first lens means having positive refractive power, a second lens means having negative refractive power, and a third lens means having positive refractive power.

The variation of the focal length of he entire objective is substantially effected by displacement of the negative second lens means along the optical axis, while a constant locus of the picture is substantially obtained by a nonlinear movement of the first positive lens means located at the front of the objective.

Objectives of this basic type have the disadvantage that if it is desired to fully illuminate a frame with the smallest aperture while the objective is focused on a near object, great increases of height take place which require large diameters of the front lenses.

A reduction of the measurements of the lenses of the objective not only effects a reduction of the manufacturing cost, but also has the advantage that the size of the camera housing can be reduced.

SUMMARY OF THE INVENTION

It is one object of the invention to provide a variable focal length objective of small dimensions and high power.

Another object of the invention is to provide a variable focal length objective of high power which can be inexpensively manufactured.

With these objects in view, the present invention provides a high power optical system having a continuously variable focal length, a constant picture position, a constant aperture ratio greater than 1:2, a quotient of the maximum focal length and the minimum focal length which is substantially 2.5, and a maximum angle of field of at least ±20°.

It is also an object of the invention to construct a variable focal length objective of small dimensions, which has high contrast and resolution in the entire range of focal lengths, but has nevertheless only a small reduction of marginal brightness.

In accordance with the invention, the diameter of the front lens is not more than three times the diameter of the utilizable picture circle, and the apex distance of the same is not more than seven times the utilizable picture circle.

It is also an object of the invention to provide, in front of the basic rearmost lens means, sufficient air space for the reflecting element of a reflector viewfinder, for the diaphragm, and for a turnable filter.

With these objects in view, a variable focal length objective according to the invention comprises a first lens means having positive power of refraction and including a diverging first lens and a converging second lens, a second lens means having negative power of refraction, and including two diverging lenses and a converging lens, a third lens means having positive power of refraction and consisting of a single lens, and a fourth lens means having positive power of refraction and including a converging lens, a diverging lens, another converging lens and another converging lens in the order from the front to the rear.

The novel features which are considered as characteristic for the invention are set forth in particular in the appended claims. The invention, and additional objects and advantages thereof, will be best understood from the following description of a specific embodiment when read in connection with the accompanying drawing.

BRIEF DESCRIPTION OF THE DRAWING

The single FIGURE of the drawing is a schematic axial sectional view illustrating an embodiment of the invention.

DESCRIPTION OF THE PREFERRED EMBODIMENT

Referring now to the drawing, the objective is shown to consist of four lens means, or groups of lenses, I, II, III and IV in the order from the front to the rear.

Lens means I consists of a first lens $L_1$ and a second lens $L_2$ which respectively have apex distances $d_1$ and $d_3$, and are separated by an air space $d_2$. The front surface of lens $L_1$ is convex to the front and has a radius of curvature $r_1$, and the rear face of lens $L_1$ is concave to the rear and has a radius of curvature $r_2$. The second lens $L_2$ has a convex front surface having a radius of curvature $r_3$, and a rear surface slightly convex to the rear and having a radius of curvature $r_4$.

The lens $L_3$ is separated from the lens $L_2$ by an air space $d_4$ and has a front face slightly convex to the front with a radius of curvature $r_5$, and a rear face concave to the rear having a radius of curvature $r_6$. The apex distance or thickness of lens $L_3$ is $d_5$. The apex distance between the lenses $L_3$ and $L_4$ is $d_6$, and the thicknesses of lenses $L_4$ and $L_5$ are $d_7$ and $d_8$, respectively. Lens $L_4$ has a front face concave to the front and having a radius of curvature $r_7$, and a rear face concave to the rear and having a radius of curvature $r_8$. Lens $L_5$ has a front face convex to the front and cemented to the rear face of lens $L_4$. The rear face of lens $L_5$ is slightly concave to the rear and has a radius of curvature $r_9$.

The singlet $L_6$ of lens means III is separated from lens $L_5$ by an air space $d_9$, and has a thickness $d_{10}$. The front face of lens $L_6$ is convex to the front and has the radius of curvature $r_{10}$, and the rear face of lens $L_6$ is convex to the rear and has a radius of curvature $r_{11}$.

The basic group of lenses IV is separated from lens 6 by an air space $d_{11}$. Lens $L_7$ has a thickness $d_{12}$, lens $L_8$ has a thickness $d_{14}$ and is separated from lens $L_7$ by an air space $d_{13}$, lens $L_9$ is separated from lens $L_8$ by an air space $d_{15}$ and has a thickness $d_{16}$. Lens $L_{10}$ is separated form lens $L_9$ by an air space $d_{17}$, and has a thickness $d_{18}$.

Lens $L_7$ has a convex front face having a radius of curvature $r_{12}$, and a rear surface convex to the rear and having a radius of curvature $r_{13}$. Lens $L_8$ has a concave front face having a radius of curvature $r_{14}$, and a concave rear face having a radius of curvature $r_{15}$. Lens $L_9$ has a concave front surface having a radius of curvature $r_{16}$, and a convex rear surface having a radius of curvature $r_{17}$. Lens $L_{10}$ has a convex front surface with a radius of curvature $r_{18}$, and a rear surface convex to the rear and having a radius of curvature $r_{19}$.

The objective is illustrated in the drawing in a position in which it has a mean focal length.

By way of example, the numerical data of a preferred embodiment of the invention are stated in the following table. The numerical data are stated with reference to a mean focal length $f_M = 1.0$, and are valid for any unit of measure. $f_M$ is the geometric mean of the minimum and maximum focal lengths of the entire objective which may be stated as follows:

$$f_M = \sqrt{f_{min} \cdot f_{max}} = 1.0$$

The first column of the table indicates the lens means I to IV, and the lenses $L_1$ to $L_{10}$. The second column states numerical values for the radii of curvatures $r_1$ to $r_{19}$, the third column states numerical values for the apex distances $d_1$ to $d_{18}$, including the maximal and minimal air spaces $d_4$ tele and $d_4$ wide angle between lens means I and II, and the maximum and minimum air spaces $d_9$ tele and $d_9$ wide angle between the lens means II and III. The third column also contains the numerical data for the minimum focal length $f_{min}$, and the maximum focal length $f_{max}$.

The fourth column contains the numerical values for the indexes of refraction $n_d$ of the glass used for the lenses for the $d$-line of the spectrum. The fifth column states the numerical values of the Abbe dispersion numbers $V_d$. The sixth column states the numerical values for the surface powers of refraction $D_1$ to $D_{19}$ of the lenses.

The value D can be mathematically expresses as follows:

$$D = \frac{n' - n}{r}$$

wherein $n'$ and $n$ are the indices of refraction in front and in the rear of the surface, and $r$ is the radius of the surface.

The aperture ratio of the objective is 1:1.9, and back focal length $s'$ is equal to 0.520.

It has been found that an objective according to the above table has high contrast and resolution in in the entire focal range, and only a small reduction of marginal brightness. The diameter of the front lens is small as compared with known objectives and is not more than three times the usable diameter of the picture circle, while the total apex length is not more than seven times the useful diameter of the picture circle. The objective is corrected for all optical errors within the entire focal range, and it is evident that objectives which do not have exactly the same numerical data as stated in the table, will be sufficiently corrected to obtain the high quality of the objective according to the invention.

Deviations from the stated numerical data are permissible for whose evaluation the standard distance A is selected which permits the comparison of two collective values $X_i$ and $X_{oi}$ in accordance with the following equation:

$$A = \frac{\sum_{i=1}^{k}(Xi - Xoi)^2}{\sqrt{\sum_{i=1}^{k} Xi^2} \cdot \sqrt{\sum_{i=1}^{k} Xoi^2}}$$

The surface power of refraction $D_o$ of the preferred embodiment of the objective having the numerical data of the above table, and the surface power of refraction D of an objective whose numerical values deviate from the date of the table within a permissible range, are considered as collective values which can be used in the above equation as follows:

$$A = \frac{\sum_{i=1}^{19}(Di - Doi)^2}{\sqrt{\sum_{i=1}^{19} D_i^2} \cdot \sqrt{\sum_{i=1}^{19} D_{oi}^2}} \leq 0.03$$

While the invention has been illustrated and described as embodied in a variable focal length objective whose maximum and minimum focal lengths have a quotient of about 2.5 and a front lens diameter of less than three times the diameter of the useful picture circle, it is not intended to be limited to the details shown, since various modifications and structural changes may be made without departing in any way from the spirit of the present invention.

What is claimed as new and desired to be protected by Letters Patent is set forth in the appended claims.

I claim:

1. Variable focal length objective of high power comprising along an optical axis in the order from the front to the rear a first lens means having positive power of refraction, a second lens means having negative power of refraction, and third and fourth lens means having positive power of refraction; said second negative lens means and said first positive lens means being simultaneously movable along said optical axis so that said second negative lens means substantially effects a variation of the focal length of the objective while said first positive lens means substantially maintains the picture in a constant position, said first lens means including a first lens and a second lens, said second lens means including a third lens, a fourth lens, and a fifth lens, said third lens means including a sixth lens, and said fourth lens means including a seventh lens, an eight lens, a ninth lens, and a tenth lens; said objective having numerical data substantially as set forth in the following table in which the numerical data refer to the mean focal length $f_M$ as unit, wherein $f_M$ is the geometrical mean of the maximal and minimal focal lengths of the objective, wherein $s'$ is the focal intercept length, wherein I to IV designate said first to fourth lens means; wherein $L_1$ to $L_{10}$ designate said first to tenth lenses, wherein $r_1$ to $r_{19}$ represent the radii of curvature and $d_1$ to $d_{18}$ represent the apex distances of said lenses along said optical axis, wherein $n_d$ represents the indices of refraction for the $d$-line of the spectrum and $V_d$ represents the Abbe dispersion numbers of said lenses, wherein $D_1$ to $D_{19}$ are the surface powers of refraction of said lenses; wherein the aperture ratio is 1:9; and wherein $f_{max}$ and $f_{min}$ represent the maximal and minimal focal lengths of the objective:

|   |   | r | d | $n_d$ | $V_d$ | D |
|---|---|---|---|---|---|---|
| I | $L_1$ | $r_1=+1.6604$ | $d_1=0.100$ | 1.78470 | 26.08 | $D_1=+0.47260$ |
|   |   | $r_2=+1.0347$ | $d_2=0.009$ |   |   | $D_2=-0.75838$ |
|   | $L_2$ | $r_3=+1.0682$ | $d_3=0.364$ | 1.71300 | 53.83 | $D_3=+0.66748$ |
|   |   | $r_4=-55.195$ | (¹) |   |   | $D_4=+0.01292$ |
| II | $L_3$ | $r_5=+12.936$ | $d_5=0.070$ | 1.58144 | 40.85 | $D_5=+0.04495$ |
|   |   | $r_6=+0.6295$ | $d_6=0.155$ |   |   | $D_6=-0.92365$ |
|   |   | $r_7=-1.1272$ | $d_7=0.061$ | 1.51821 | 65.05 | $D_7=-0.45973$ |
|   | $L_4$ | $r_8=+0.8742$ | $d_8=-.130$ | 1.78470 | 26.08 | $D_8=+0.30484$ |
|   | $L_5$ | $r_9=+6.0136$ | (²) |   |   | $D_9=-0.13049$ |
| III | $L_6$ | $r_{10}=+2.9979$ | $d_{10}=0.081$ | 1.62014 | 63.52 | $D_{10}=+0.20686$ |
|   |   | $r_{11}=-2.9979$ | $d_{11}=0.505$ |   |   | $D_{11}=+0.20686$ |
| IV | $L_7$ | $r_{12}=+0.5052$ | $d_{12}=0.177$ | 1.71300 | 53.83 | $D_{12}=+1.41132$ |
|   |   | $r_{13}=-5.8668$ | $d_{13}=0.102$ |   |   | $D_{13}=+0.12153$ |
|   | $L_8$ | $r_{14}=-0.9660$ | $d_{14}=0.186$ | 1.78470 | 26.08 | $D_{14}=-0.81232$ |
|   |   | $r_{15}=+0.4479$ | $d_{15}=0.193$ |   |   | $D_{15}=-1.75195$ |
|   | $L_9$ | $r_{16}=-2.7248$ | $d_{16}=0.102$ | 1.71300 | 53.83 | $D_{16}=-0.26167$ |
|   |   | $r_{17}=-0.7910$ | $d_{17}=0.006$ |   |   | $D_{17}=+0.90139$ |
|   | $L_{10}$ | $r_{18}=+0.6437$ | $d_{18}=0.162$ | 1.71300 | 53.83 | $D_{18}=+1.10766$ |
|   |   | $r_{19}=-13.897$ |   |   |   | $D_{19}=+0.05131$ |

¹ $d_4$ wide angle=0.035; $d_4$=0.501; $d_4$ tele=0.800.
² $d_9$= wide angle=0.816; $d_9$=0.516; $d_9$ tele=0.049.

NOTE: $f_{min}=0.641$; $f_M=1.000$; $f_{max}=1.560$; $s'=0.520$.